United States Patent
Young et al.

[19]

[11] Patent Number: 6,144,482
[45] Date of Patent: Nov. 7, 2000

[54] ACOUSTO-OPTIC MODULATOR FOR SELECTIVE EXTRACTION OF ONE OR MORE WAVELENGTHS FROM RANDOMLY POLARIZED POLYCHROMATIC LIGHT BEAM

[75] Inventors: Eddie H. Young; Huey-Chin Ho; Michael D. Case, all of Melbourne; Robert V. Belfatto, Sr., Melbourne Beach, all of Fla.

[73] Assignee: Neos Technologies, Inc., West Melbourne, Fla.

[21] Appl. No.: 09/191,949

[22] Filed: Nov. 13, 1998

Related U.S. Application Data

[60] Provisional application No. 60/066,015, Nov. 14, 1997.

[51] Int. Cl.[7] .................................................. G02F 1/33
[52] U.S. Cl. ........................ 359/305; 359/308; 359/309; 359/312
[58] Field of Search ............................... 359/308, 309, 359/305, 313, 312

[56] References Cited

U.S. PATENT DOCUMENTS

| | | | |
|---|---|---|---|
| 4,357,627 | 11/1982 | Johnson | 358/348 |
| 4,460,250 | 7/1984 | Freyre et al. | 350/358 |
| 4,582,397 | 4/1986 | Chang | 350/372 |
| 5,146,358 | 9/1992 | Brooks | 359/181 |
| 5,253,073 | 10/1993 | Crowley | 358/231 |
| 5,463,493 | 10/1995 | Shah | 359/312 |
| 5,552,916 | 9/1996 | O'Callaghan et al. | 359/95 |

OTHER PUBLICATIONS

"New Noncollinear Acousto–Optic Tunable Filter Using Birefingence in Paratellurite", by T. Yano and A. Watanabe, *Applied Physics Letters*, vol. 24, No. 6, Mar. 15, 1974, pp.256–258.

*Primary Examiner*—Georgia Epps
*Assistant Examiner*—Tim Thompson
*Attorney, Agent, or Firm*—Charles E. Wands

[57] ABSTRACT

A polarization-independent polychromatic light modulator applies one or more pairs of predetermined RF drive frequencies to an acousto-optic transducer of an acousto-optic modulator body upon which a single beam of randomly polarized or unpolarized polychromatic input light is incident. No precursor polarization separation elements are employed. For each optical wavelength to be extracted from the incident beam, two RF drive frequencies are employed. The acoustic waves launched into the acousto-optic medium by the application of the two frequencies of a given RF drive frequency pair produce respective +1 and −1 order output beam components of the selected output wavelength (as well as a zeroth order beam for that wavelength). Because the +1 and −1 order beams depart the modulator body along spatially diverse paths, they are intercepted by a set of recombination optics, which blocks the zero order beam component and recombines the desired +1 and −1 order beams into a single composite beam containing a selected wavelength. Where the output beam is to contain a mixture of multiple wavelengths for producing a composite color output light beam, as in the case of a modulated laser projector entertainment system, multiple pairs of RF drive frequencies are applied to the acousto-optic modulator.

10 Claims, 2 Drawing Sheets

ACOUSTO-OPTIC MODULATOR FOR SELECTIVE EXTRACTION OF ONE OR MORE WAVELENGTHS FROM RANDOMLY POLARIZED POLYCHROMATIC LIGHT BEAM

CROSS-REFERENCE TO RELATED APPLICATIONS

The present application claims the benefit of U.S. provisional application Serial No. 60/066,015, filed Nov. 14, 1997, entitled "PCAOM for Unpolarized Laser Beams."

FIELD OF THE INVENTION

The present invention relates in general to light modulation systems, and is particularly directed to a method and apparatus for selectively extracting one or more wavelengths (colors) from an unpolarized or randomly polarized polychromatic light beam, by the application of one or more pairs sets of radio frequency (RF) drive frequencies to a single acousto-optic modulator, respectively different (+/−1) order output beams of which are recombined into a single output beam containing only the one or more extracted wavelengths.

BACKGROUND OF THE INVENTION

The M. Shah, U.S. Pat. No. 5,463,493 (hereinafter referred to as the '493 patent), entitled: "Acousto-Optic Polychromatic Light Modulator," describes a polychromatic acousto-optic modulator (PCAOM) that is configured to overcome a number of hardware complexity and operational deficiencies of color laser projection systems employing multiple 'single-color' modulators. For this purpose, the polychromatic acousto-optic modulation scheme employed in the '493 patent uses an acousto-optic medium and a single piezo-electric transducer attached to the acousto-optic medium to convert a multi-RF frequency input signal into ultrasonic waves for modulating a multi-wavelength input light beam. An electronic driver supplies electrical signals containing a plurality of different RF frequency components, the intensities of which are controlled in response to input electronic data, so as to produce a desired multi optical frequency (color) beam output from the diffracted polychromatic beam.

Where it is desirable that the polychromatic modulator produce a single highly convergent polychromatic output beam from a randomly polarized input beam, the '493 patent describes a modulator configuration diagrammatically illustrated in FIG. 1, which effectively corresponds to FIG. 11 of the '493 patent. As generally described in column 8, lines 43–67, and column 9, lines 1–22, and more particularly, in lines 23–47 of the '493 patent, for such an embodiment, a randomly polarized polychromatic input light beam 110 traveling in a direction having an angle Ci relative the transducer bonding face 41 is first spatially separated into two orthogonally polarized beams 111 and 112, using a birefringent plate as an input beam polarization separation interface.

The entrance face of the modulator body (the acousto-optic medium, such as a TeO₂ crystal) 40 is cut with two facets 115 and 116 with respective angles $\alpha_i^1$ and $\alpha_i^2$ from the bonding face 41 of a transducer 43 to provide independent angles for the two polarization states produced by the birefringent plate 114. The RF frequencies and drive levels applied over input signal lines 47 to an RF driver 45 are selected to cover all desired wavelengths and its polarizations. The exit face of the modulator body 40 is also cut with two facets 117 and 118 at respective angles at $\alpha_i^1$ and $\alpha_i^2$ from the bonding face 41 to provide independent exit angles for each polarization. An output beam polarization combining interface in the form of a birefringent plate 119 is positioned at the output side of the modulator body 40, in order to recombine the two orthogonally polarized polychromatic output beams into one convergent beam 120. If the desired output consists of two orthogonally polarized individually color convergent separated beams, then the birefringent plate 119 is eliminated.

The '493 patent further states that calculations show that at Ci=55°, $\alpha_i^1=0°$, $\alpha_o^1=87.93°$, $\alpha_i^2=92.07°$, and $\alpha_o^2=0°$ in far-off-axis mode TeO₂, the first order diffracted beams for each polarization emerge the modulator body in precisely the same direction as the incident optical beam, and the RF drive frequency for any selected wavelength within the visible range is independent of the polarization state.

A shortcoming of this configuration is the fact that it is, in reality, a polarization sensitive device, so that it requires a hardware intensive architecture. Namely, the prior art device of FIG. 1 installs a polarization separation interface (birefringent plate 114) in the path of the optical input beam 110 upstream of the modulator body 40, in order to provide two orthogonally polarized input beams upon which the modulator body may operate. In order to interact with these spatially separated and orthogonally polarized beams, the modulator body itself is fashioned as a specially cut crystal body with differentially cut entrance and exit facets.

SUMMARY OF THE INVENTION

In accordance with the polarization-independent polychromatic light modulator of the present invention, such shortcomings are effectively obviated by the application of one or more pairs of predetermined RF drive frequencies to the acousto-optic transducer of a relatively simple shaped acousto-optic modulator body, for selectively extracting one or more optical wavelengths from a randomly polarized or unpolarized polychromatic input light beam. Unlike the systems of the prior art, the input light beam is directly incident upon the acousto-optic medium in its unpolarized or randomly polarized state. No precursor polarization separation elements are employed.

For each optical wavelength to be extracted from the incident beam, two RF drive frequencies are employed. The acoustic waves launched into the acousto-optic medium by the application of the two frequencies of a given RF drive frequency pair produce respective +1 and −1 order output beam components of the selected output wavelength (as well as a zeroth order beam for that wavelength). Because the +1 and −1 order beams depart the modulator body along spatially diverse paths, they are intercepted by a set of recombination optics, which blocks the zero order beam component and recombines the desired +1 and −1 order beams into a single composite beam containing the desired wavelength.

Where the output beam is to contain a mixture of multiple wavelengths for producing a desired composite color output light beam, as in the case of a modulated laser projector entertainment system, multiple pairs of RF drive frequencies are applied to the acousto-optic modulator, thereby extracting a +1 and −1 order output beam component pair for each of the plural wavelengths of interest.

DETAILED DESCRIPTION

Figure 2:
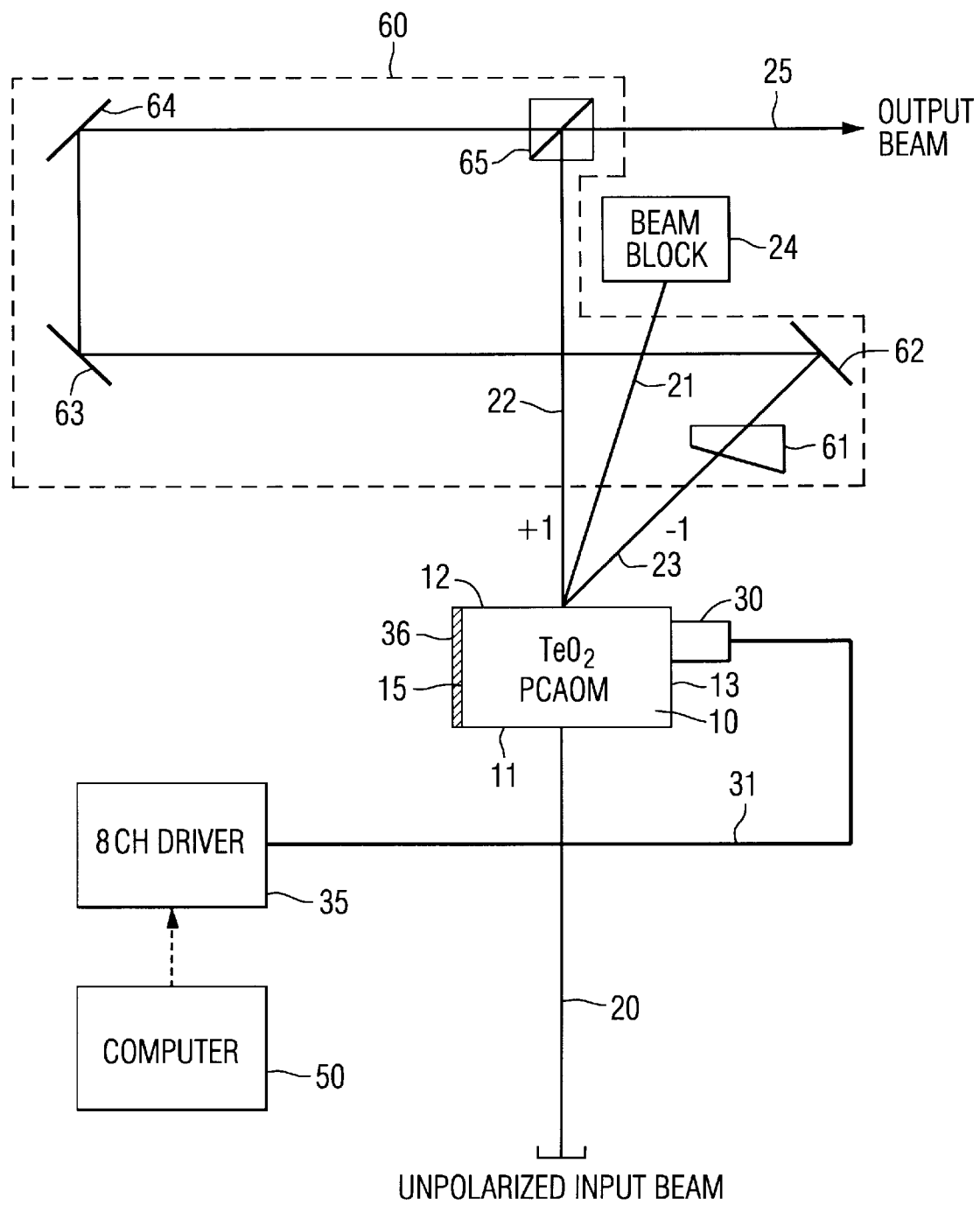
FIG. 2 diagrammatically illustrates an embodiment of the polarization independent polychromatic light modulator of the invention.

Referring now to FIG. 2, an embodiment of the polarization independent polychromatic light modulator of the invention is diagrammatically illustrated as comprising a regular geometry shaped body 10 of acoustic optic material, such as $TeO_2$, as a non-limiting example. Modulator body 10 is positioned in the path of a randomly polarized polychromatic input light beam 20, such as a collimated laser beam, that is directed upon an entrance face 11 of the modulator body 10. For purposes of providing a non-limiting example, the acoustic optic modulator body 10 may have a generally rectangular solid shape, in which respective beam entrance (incidence) and exit faces 11 and 12 are mutually parallel to each other and are orthogonal to a generally flat acoustic transducer bonding face 13 upon which an electro-acoustic (e.g., piezoelectric) transducer 30 is mounted.

In a customary manner, piezoelectric transducer 30 is operative to launch an optical beam-diffracting acoustic wave into the modulator body 10, in response to the application of an RF drive signal input. Upon reaching the far end or rear face 15 of the modulator body 40, the acoustic wave is absorbed by an acoustic absorber 36 mounted on the rear face 15 of the body 10. The traveling acoustic wave interacts with and extracts or outputs +1 and −1 order polarization components of a prescribed wavelength within the polychromatic input beam 20 along spatially divergent beam paths, in accordance with the particular pair of RF drive frequency signals that are applied to the piezoelectric transducer 30.

The drive signals for the transducer 30 are supplied by way of a link 31 from a programmable multi-channel driver (frequency synthesizer) 35, that is operative, under control of a system control processor 50, to generate one or more pairs of predetermined RF drive frequencies for application to the acousto-optic transducer 30. As described briefly above, in a practical color modulation system, such as employed by commercial laser light projection and scanning systems, the various pairs of drive frequencies are selected to extract (the +1 and −1 order beams of) respectively different optical wavelengths from the unpolarized or randomly polarized polychromatic input light beam 20 incident upon the entrance face 11 of the modulator body 10.

Theoretical and experimental analysis of the acousto-optic properties of $TeO_2$ has revealed a pair of RF drive frequency vs. extracted wavelength characteristics shown at 37 and 38 in the graphical plot of FIG. 3 and in Table I below, for the case of an unpolarized or randomly polarized 'white' light beam (one that encompasses the visible spectrum—the 450–700 nm wavelength range), having an angle of incidence $\alpha_i$ on the order of 20°—in particular 19.97°—relative to the direction of propagation of an acoustic wave traveling through the $TeO_2$ body. The theoretical analysis was based upon the equations set forth in an article by T. Yano and A. Watanabe, entitled: "NEW NONCOLLINEAR ACOUSTO-OPTIC TUNABLE FILTER USING BIREFRINGENCE IN PARATELLURITE," published in Applied Physics Letters, Vol. 24, No. 6, October 1974, pp. 256–258.

TABLE I

| Wavelength (nm) | | Experimental Frequency (MHz) | Theoretical Frequency (MHz) |
|---|---|---|---|
| 457 | −1 order | 78.34 | 78.58 |
|  | +1 order | 73.60 | 73.84 |
| 476 | −1 order | 73.86 | 73.98 |
|  | +1 order | 69.49 | 69.58 |
| 488 | −1 order | 71.38 | 71.39 |
|  | +1 order | 67.18 | 67.16 |
| 514 | −1 order | 66.33 | 66.33 |
|  | +1 order | 62.48 | 62.45 |

Figure 1:
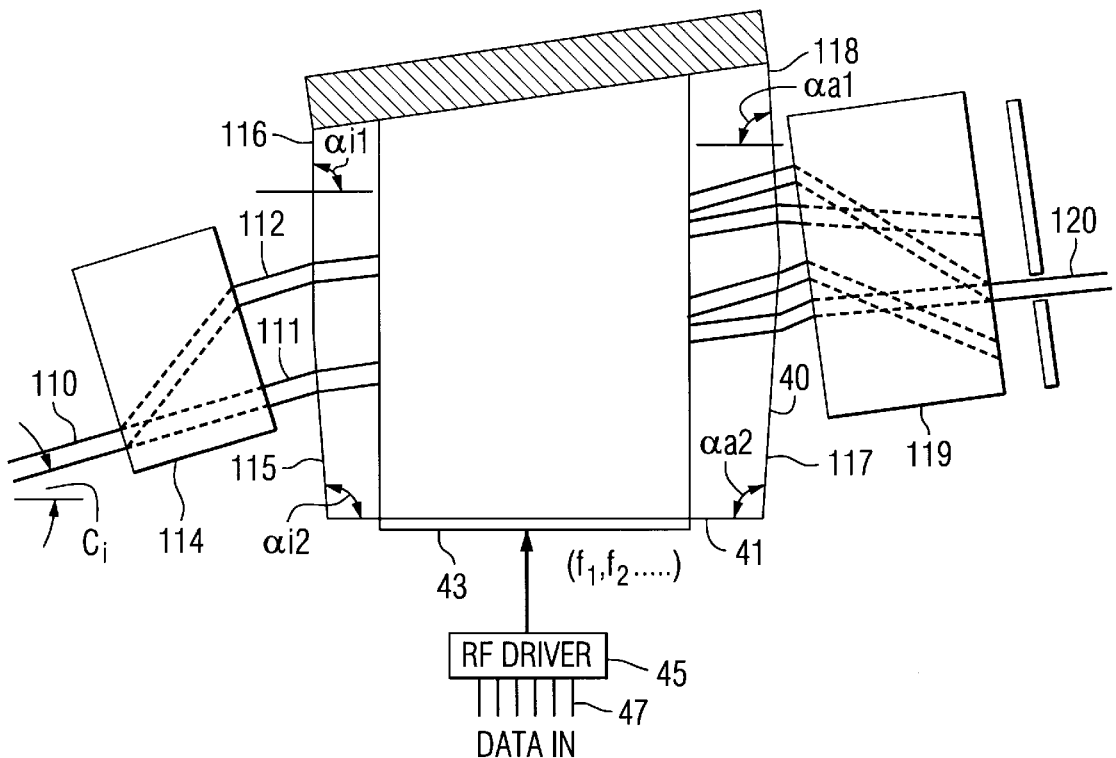
FIG. 1 diagrammatically illustrates a polychromatic light modulator for randomly polarized light that effectively corresponds to FIG. 11 of U.S. Pat. No. 5,463,493.

For the present example of configuring the ($TeO_2$) modulator body 10 to have a generally rectangular solid shape, as described above, this means that the modulator body 10 may be oriented such that its beam incidence face 11 has an acute angle of (90°−19.97°=) 70.03° relative to the direction of travel of the randomly polarized polychromatic input beam 20. The present invention requires no specially faceted modulator crystal, nor polarization beam separator, such as the birefringent plate in the prior art configuration of FIG. 1, discussed above.

Figure 3:
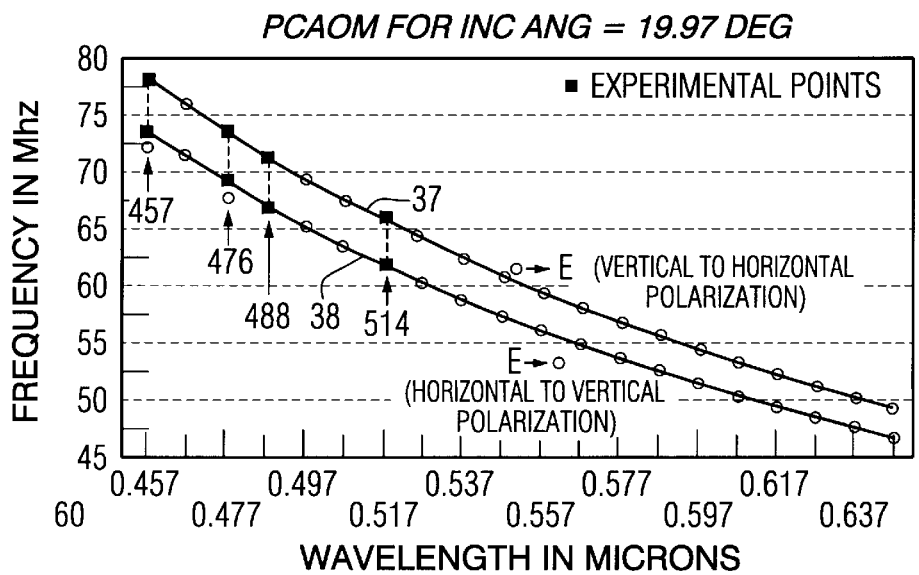
FIG. 3 is a graphical plot of acousto-optic properties of $TeO_2$ showing the relationship between RF drive frequency and extracted optical wavelength for a given angle of light beam incidence with the traveling acoustic wave.

As shown in FIG. 3, and as tabulated in Table I below, for extracting any or all of the four colors or wavelengths: 457 nm, 476 nm, 488 nm and 514 nm from an unpolarized or randomly polarized white input light beam, an eight channel driver (frequency synthesizer) 35 of the modulator of FIG. 2 may be programmed to generate corresponding ones of the pairs of frequencies listed in the experimental frequency column of Table I, which are a very close match to those listed in the theoretical (deterministic) column. Thus, in the above-mentioned example of a modulated laser projector entertainment corresponding ones of the pairs of frequencies listed in the experimental frequency column of Table I, which are a very close match to those listed in the theoretical (deterministic) column. Thus, in the above-mentioned example of a modulated laser projector entertainment system, where the output beam is a composite color beam containing a mixture of different wavelengths, multiple RF drive frequency pairs of FIG. 3 and Table I may be applied to the transducer 30 of the acousto-optic modulator 10 thereby extracting +1 and −1 order output beam component pairs for the plural colors of interest.

As described briefly above, and as shown in FIG. 2, in addition to a zeroth order beam 21, the interaction of the acoustic wave for each RF drive frequency pair produces respective +1 and −1 order output beams at a selected optical wavelength to be extracted from the polychromatic input beam 20. The zeroth order beam 21 is shown as traveling along a path that is diverse from each of the spatially divergent paths 22 and 23 of the +1 and −1 order beams, respectively; the zeroth order beam 21 is blocked (absorbed) by a suitable stop (filter block) 24.

Because of the spatial divergence of the +1 and −1 order beam paths of the extracted wavelength/color beam component, paths 22 and 23 are intercepted by a recombination optics subsystem, shown in broken lines 60, that is operative to recombine the desired +1 and −1 order beams into a single composite output beam traveling along an output beam path 25 and containing only the extracted wavelength(s) defined by the pair(s) of RF drive frequencies applied by the multi-channel driver 35 to the transducer 30.

In accordance with the illustrated and non-limiting example of FIG. 2, the recombination optics subsystem 60 employs a generally wedge-shaped prism 61 and a set of downstream mirrors 62-63-64. These beam deflection components are disposed in the path 23 of the −1 order beam for directing the −1 order beam along the output beam path 25 toward a beam combiner 65. The beam combiner 65 is positioned in the path 22 of the +1 order beam, so as to intercept and deflect the +1 order beam along the same output beam path 25, thereby producing a composite output beam that contains each of the +1 and −1 order beams extracted by the modulator 10.

As will be appreciated from the foregoing description, shortcomings of polarization dependent light modulator systems of the prior art are effectively obviated in the polarization-independent polychromatic light modulator of the present invention, which applies one or more pairs of RF drive frequencies to a relatively simple shaped acousto-optic modulator body, so as to selectively extract one or more optical wavelengths from a randomly polarized or unpolarized polychromatic input light beam. Unlike the systems of the prior art, the input light beam is directly incident upon the acousto-optic medium in its unpolarized state. No precursor polarization separation elements are employed. Wavelength selection is readily accomplished electronically by means of a programmable multichannel frequency synthesizer.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. An acousto-optic polychromatic light modulator comprising:

an acousto-optic medium having a substantially planar entrance face upon which a polychromatic light beam, which has any arbitrary polarization or is unpolarized, is incident in a direction orthogonal to said substantially planar entrance face, such that regardless of polarization of said incident polychromatic light beam, any and all polarization components thereof will continue to travel along said direction through said acousto-optic medium;

an electro-acoustic transducer coupled to said acousto-optic medium and being operative to convert electrical signals supplied thereto into acoustic waves launched into said acousto-optic medium for interaction with said polychromatic input light beam incident upon said substantially planar entrance face and traveling through said acousto-optic medium;

an electronic driver which is coupled to said electro-acoustic transducer and is operative to generate electrical signals containing at least one pair of RF frequencies, a respective pair of RF frequencies being operative to cause said acoustic waves launched into said acousto-optic medium to interact with said polychromatic input light beam and extract therefrom respective +1 and −1 order beam components of a selected wavelength contained within said polychromatic input light beam; and a beam combiner disposed in the path of said respective +1 and −1 order beam components and being operative to recombine +1 and −1 order beam components extracted by said acousto-optic medium into a single composite beam containing said at least one selected light wavelength.

2. An acousto-optic polychromatic light modulator according to claim 1, wherein said beam combiner is operative to block a zeroth order beam component of said at least one selected wavelength.

3. An acousto-optic polychromatic light modulator according to claim 1, wherein said electronic driver is operative to generate electrical signals containing a plurality of different pairs of RF frequencies, each respectively different pair of RF frequencies being operative to cause said acoustic waves launched into said acousto-optic medium to interact with said polychromatic input light beam and extract therefrom respective +1 and −1 order beam components of respectively different wavelengths contained within said polychromatic input light beam, and wherein said beam combiner is operative to recombine +1 and −1 order beam components of each of said respectively different wavelengths into a polychromatic output light beam.

4. An acousto-optic polychromatic light modulator according to claim 1, wherein said acousto-optic medium comprises $TeO_2$, and said polychromatic input light beam has an angle of incidence on the order of 70° relative to the direction of propagation of said acoustic waves through said acousto-optic medium.

5. An acousto-optic polychromatic light modulator according to claim 4, wherein said polychromatic input light beam comprises an unpolarized white light beam, and wherein said electronic driver is operative to generate electrical signals containing a plurality of different pairs of RF frequencies that are effective to extract two or more of the wavelengths 457 nm, 476 nm, 488 nm and 514 nm from said unpolarized white input light beam.

6. A method of generating an output light beam containing at least one selected optical wavelength contained within a polychromatic input light beam, which has any arbitrary polarization or is unpolarized, comprising the steps of:

(a) providing an acousto-optic medium having a substantially planar entrance face upon which said polychromatic input light beam is incident in a direction orthogonal to said substantially planar entrance face, such that regardless of polarization of said incident polychromatic input light beam, any and all polarization components thereof will continue to travel along said direction through said acousto-optic medium, and an electro-acoustic transducer that is operative to convert electrical signals supplied thereto into acoustic waves launched into said acousto-optic medium for interaction with said polychromatic input light beam incident upon said substantially planar entrance face in said direction orthogonal thereto and traveling along said direction through said acousto-optic medium;

(b) applying electrical signals to said electro-acoustic transducer, said electrical signals containing at least one pair of RF frequencies, a respective pair of RF frequencies being operative to cause said acoustic waves launched into said acousto-optic medium to interact with said polychromatic input light beam of random polarization and extract therefrom respective +1 and −1 order beam components of a selected wavelength contained within said polychromatic input light beam; and (c) recombining +1 and −1 order beam components extracted in step (b) into a single composite beam containing said at least one selected light wavelength.

7. A method according to claim 6, wherein step (c) further includes blocking a zeroth order beam component of said at least one selected wavelength.

8. A method according to claim 6, wherein said electrical signals applied in step (b) contain a plurality of different pairs of RF frequencies, each respectively different pair of RF frequencies being operative to cause said acoustic waves launched into said acousto-optic medium to interact with said polychromatic input light beam and extract therefrom respective +1 and −1 order beam components of respectively different wavelengths contained within said polychromatic input light beam, and wherein step (c) comprises recombining +1 and −1 order beam components of each of said respectively different wavelengths into a polychromatic output light beam.

9. A method according to claim 6, wherein said acousto-optic medium comprises $TeO_2$, and said polychromatic input light beam has an angle of incidence on the order of 70° relative to the direction of propagation of said acoustic waves through said acousto-optic medium.

10. A method according to claim 9, wherein said polychromatic input light beam comprises an unpolarized white light beam, and wherein said electrical signals applied in step (b) contain a plurality of different pairs of RF frequencies that are effective to extract two or more of the wavelengths 457 nm, 476 nm, 488 nm and 514 nm from said unpolarized white input light beam.

* * * * *